United States Patent
Liberko et al.

(10) Patent No.: US 10,848,253 B1
(45) Date of Patent: Nov. 24, 2020

(54) SYSTEM AND METHOD FOR HISTORICAL RADIO PERFORMANCE ANALYSIS OR VISUALIZATION

(71) Applicant: Rockwell Collins, Inc., Cedar Rapids, IA (US)

(72) Inventors: Nicholas J. Liberko, Marion, IA (US); Brian R. Wolford, Cedar Rapids, IA (US); Daniel K. Snodgrass, Palo, IA (US); Boe A. Svatek, Cedar Rapids, IA (US); Kevin M. McElroy, Vint Hill Farms, VA (US); Kevin M. Kronfeld, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/008,614

(22) Filed: Jun. 14, 2018

(51) Int. Cl.
| | |
|---|---|
| *H04B 17/318* | (2015.01) |
| *H04B 17/00* | (2015.01) |
| *H04W 24/10* | (2009.01) |
| *H04W 24/08* | (2009.01) |
| *H04B 7/185* | (2006.01) |

(52) U.S. Cl.
CPC ....... *H04B 17/318* (2015.01); *H04B 17/0085* (2013.01); *H04W 24/08* (2013.01); *H04W 24/10* (2013.01); *H04B 7/18506* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,407,000 | B1* | 8/2016 | Willistein | H01Q 1/30 |
| 9,797,978 | B1* | 10/2017 | Melamed | G01S 3/14 |
| 10,389,432 | B2* | 8/2019 | De Rosa | B64C 39/024 |
| 2007/0086349 | A1* | 4/2007 | Liu | H04L 41/5038 370/241 |
| 2007/0213925 | A1* | 9/2007 | Sharma | G01C 21/3461 455/456.1 |
| 2009/0251354 | A1* | 10/2009 | Zahavi | F41H 11/00 342/20 |
| 2015/0304869 | A1* | 10/2015 | Johnson | H04W 24/08 701/2 |
| 2017/0012697 | A1* | 1/2017 | Gong | H04W 40/02 |
| 2017/0168480 | A1* | 6/2017 | Wanstedt | B64C 39/024 |
| 2017/0324469 | A1* | 11/2017 | Jalali | H04B 7/18502 |
| 2018/0017973 | A1* | 1/2018 | Teague | B64C 39/024 |
| 2018/0097560 | A1* | 4/2018 | Jalali | H04W 28/0236 |
| 2018/0375568 | A1* | 12/2018 | De Rosa | H04B 7/18506 |

\* cited by examiner

*Primary Examiner* — Junpeng Chen
(74) *Attorney, Agent, or Firm* — Suiter Swantz pc llo (57) ABSTRACT

A communication link analysis system is for analyzing communication link performance for an unmanned aviation system traveling over a route using a radio network comprising a plurality of radio nodes. The communication link analysis system includes a memory for storing quality parameters associated with communication links between the unmanned aviation system and the radio nodes. The communication link analysis system also includes a processor configured to map the quality parameters by location along the route or provide a bin chart of the quality parameter by radio node. The quality parameter is derived from radio link parameters provided by the unmanned aviation system.

20 Claims, 7 Drawing Sheets

SYSTEM AND METHOD FOR HISTORICAL RADIO PERFORMANCE ANALYSIS OR VISUALIZATION

BACKGROUND

The inventive concepts disclosed herein relate generally to the field of communication systems. More particularly, embodiments of the inventive concepts disclosed herein relate to systems and methods for analyzing or visualizing radio performance.

Robust radio coverage is important for communication systems. Radio performance can be affected by a variety of factors including, but not limited to: status of the radio equipment, antenna position and placement, structures in the environment, traffic, and interference. The radio performance can vary according to radio position, antenna orientation, power levels, frequency band, and other factors. According to one example of an application of communication systems, beyond visual line of sight (BVLOS) unmanned aerial vehicle (UAV) or unmanned aviation system (UAS) operations require robust and continuous communication links (e.g., command and control (C2) links). Usage of point-to-point C2 links combined with low altitude operations necessitates networks of ground radios to ensure continuous coverage over large geographical areas. UAS operations are used in a wide variety of applications including but not limited to: military/defense, security, land/crop surveying, oil/gas exploration and recovery, transportation monitoring, and other observation and surveillance tasks. Ensuring that the communication coverage is continuous and high performing in all areas can be difficult.

SUMMARY

In one aspect, the inventive concepts disclosed herein are directed a radio unit for an unmanned aviation system (UAS). The radio unit includes a memory and a processor. The processor is configured to capture communication link parameters associated with a communication link between the unmanned aviation system and at least one radio node in a radio network and store the communication link parameters in the memory. The processor is configured to cause the stored communication link parameters to be transmitted a ground station. The communication link parameters includes a radio parameter, a position of the unmanned aviation system, an identification of the unmanned aviation system, and an identification of the at least one radio node associated with the communication link.

In another aspect, the inventive concepts disclosed herein are directed to a method of providing visualization of communication link performance along a route for an unmanned aviation system. The method includes receiving parameters associated with radio links from an unmanned aviation system (UAS). The method also includes providing a quality factor for the radio links along the route corresponding to locations of the unmanned aviation system. The method also includes providing a map displaying the quality factor at the locations along the route.

In a further aspect, the inventive concepts disclosed herein are directed to a communication link analysis system for analyzing communication link performance for a unmanned aviation system traveling over a route using a radio network including radio nodes. The communication link analysis system includes a memory for storing quality parameters associated with communication links between the unmanned aviation system and the radio nodes. The communication link analysis system also includes a processor configured to map the quality parameters by location along the route or provide a bin chart of the quality parameters by radio node. The quality parameters are derived from radio link parameters provided by the unmanned aviation system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure. While the present disclosure describes systems and methods implementable in communication system for a UAS, the inventive concepts disclosed herein may be used in any type of environment, such as for aircraft, a spacecraft, a ground-based vehicle, water vehicle, simulation, or a non-vehicle communication applications. While certain examples and embodiments of the inventive concepts disclosed herein are described with respect to an operator of a UAS, it will be appreciated that other users and pilots may use and benefit from the inventive concepts disclosed herein with respect to other vehicles, systems, and/or objects.

Embodiments of the inventive concepts disclosed herein are directed to systems and methods of analyzing and/or displaying radio performance associated with a radio network for a vehicle, such as a UAS. The systems and methods automatically collect radio operational parameters and present them to a user in a readily understandable form so that the user can focus on the task of flying the UAS rather than monitoring radio performance in some embodiments. In some embodiments, the systems and methods perform radio frequency (RF) signal analysis in real time as the vehicle travels across a route and communicates with radio nodes in the network. In some embodiments, the analysis and presentation of the analysis reduces: 1. difficulty in distinguishing one-off vs chronic issues, 2. the difficulty in characterizing extent of C2 outages or periods of reduced performance, and 3. the limitations of theoretical predictions (e.g., predictions of structural masking, interference sources, model limitations, etc.).

In some embodiments, the systems and methods provide for a record of present or past communication link (C2 link) performance for regulatory authorities. In some embodiments, the systems and methods advantageously combine the data from a C2 radio network with geographical information to provide insights into overall C2 system performance and solutions to problems with C2 system performance. In some embodiments, the systems and methods provide a cartographic scatter-plot based visualization with collocated relevant data (e.g., ground radio locations, historical RF performance at each location, radio link health indicated by color code, and relevant RF metrics (e.g., signal strength, signal to noise ratio, channel quality, packet loss) combined into single, simple, link health metric.

In some embodiments, the collected radio parameters or data are tagged for easy filtering and processing. In some embodiments, the systems and methods allow an operator to toggle between uplink (ground to air) and downlink (air to ground) health metrics. In some embodiments, the systems and methods filter the data by tower which is useful for evaluating particular ground radio nodes (e.g., highlights underperforming towers and other tower side issues and highlights areas of tower or terrain induced signal masking). In some embodiments, the systems and methods improve upon signal propagation, loss, and terrain analysis predictions with real data and assist understanding extent of coverage. In some embodiments, the systems and methods filter the data by UAS heading which is useful for insight into issues with orientational dependencies (e.g. vehicle masking) for antenna placement decisions). In some embodiments, the systems and methods aggregate the data from many flights to highlight areas and circumstances that are chronically problematic while averaging noise.

In some embodiments, the systems and methods more easily identify and characterize common problems with RF network coverage which reduces cost of C2 network deployment and tuning, which reduces time and cost of investigating RF issues, and which alerts users to chronic issues that are otherwise overlooked via conventional systems. In some embodiments, the systems and method are advantageously employed in operations management tools (e.g., WebUAS, a Rockwell Collins' operations management tool that coordinates the multi-node CNPC network, provides real-time situational awareness to flight safety critical information such as link quality, and acts as a gateway to weather, air traffic and critical information and services). In some embodiments, the systems and methods are used to inform a feed-forward system to switch to historically better performing towers when approaching a known trouble area.

Figure 1:
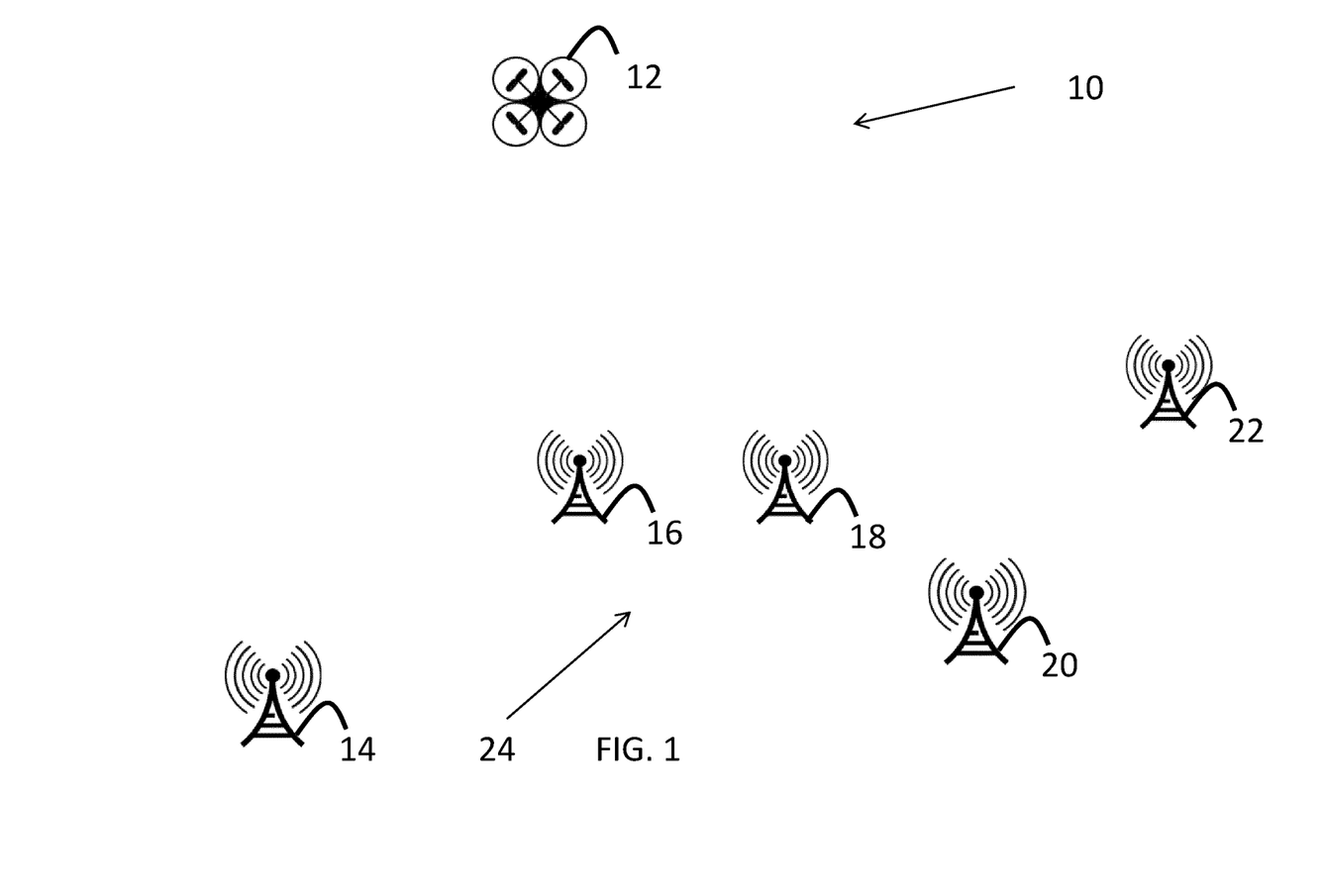
FIG. 1 is schematic drawing of an environment for a UAS including a radio network of radio nodes according to exemplary aspects of the inventive concepts disclosed herein.

With reference to FIG. 1, an environment 10 includes a UAS 12. The UAS 12 operates in the environment 10 using C2 communications with one or more radio towers or radio nodes 14, 16, 18, 20, and 22 in a radio network 24. The radio network 24 is a 2G, 3G, 4G, 5G, long term evolution (LTE), WiFi, satellite, proprietary, combinations thereof, or other network. The radio network 24 and the radio nodes 14, 16, 18, 20, and 22 have access to or are interconnected with other network elements, for instance, Ethernets, local area networks, wide area networks, the Internet, etc. in some embodiments.

The radio nodes 14, 16, 18, 20, and 22 provide command and control communication links (e.g., C2 links) with the UAS 12 for one or more respective coverage areas. The radio nodes 14, 16, 18, 20, and 22 operate according to the control and non-payload communications (e.g., CNPC-1000) data link protocol in some embodiments. The radio nodes 14, 16, 18, 20, and 22 include hardware for transmitting and receiving implements the Control and Non-Payload Communications (CNPC) waveforms in an optimized package for the small to large unmanned aircraft in some embodiments. The radio nodes 14, 16, 18, 20, and 22 operate according to various standards (e.g., standards for transceiver station (BTS) in Global System for Mobile Communications (GSM) (Node B or eNB in LTE systems), air traffic control reporting system (ATC-RS), L-Band Low Earth Orbit (LEO), a Ku band geosynchronous (GEO), or a Ka band GEO satellite radio, automatic dependent surveillance broadcast (ADS-B), Wi-Fi devices, and traffic information services broadcast (TIS-B) systems, and combinations thereof). The communication with the UAS 12 is based upon packet data communication including but not limited to: LTE (or 5G), on vehicle-to-everything (V2X) communication, or similar communication with both network assisted and direct device-to-device (D2D) communication available in some embodiments.

The UAS 12 or drone is used in a wide range of applications spanning from military to commercial applications (e.g., surveillance, reconnaissance, remote sensing, search and rescue, aerial photography, crop surveys, on-demand emergency communications, traffic control, monitoring natural resource exploration, traffic and transportation monitoring, etc.). In some embodiments, the UAS 12 is configured to inspect railroad tracks along a route. The route is a predefined route, a user configurable route, or a route chosen by a pilot in real time.

Figure 2:
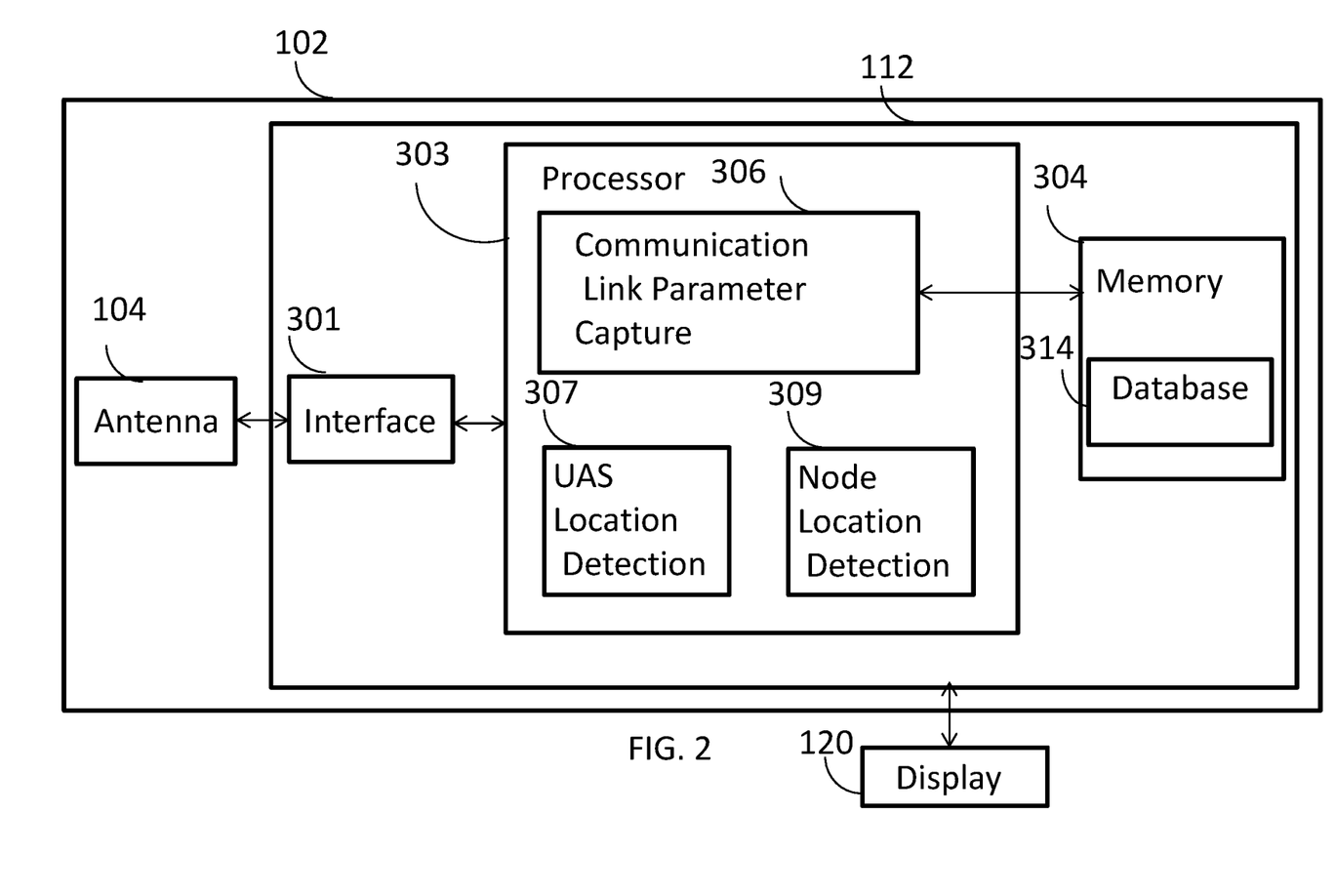
FIG. 2 is a general block diagram of communication system including a radio for the UAS or radio nodes illustrated in FIG. 1 according to exemplary aspects of the inventive concepts disclosed herein.

With reference to FIG. 2, a control system 102 for the UAS 12 (FIG. 1) or one or more of the radio nodes 14, 16, 18, 20, and 22 includes a radio unit 112 coupled to an antenna 104. The control system 102 controls the operation of the one or more radio nodes 14, 16, 18, 20, and 22 or the UAS 12 and can respond to commands provided via a C2 link. The radio unit 112 includes a processor 303, a memory 304, and a transmit/receive interface circuit 301 in one or more embodiment. An optional display 120 for viewing data stored in the memory 304 and providing messages to the user can be provided. In some embodiments, the radio unit 112 and the processor 303 are part of or integrated with a navigation system for the UAS 12, or are part of or integrated with one of a control or ground station for the radio nodes 14, 16, 18, 20, and 22, or the UAS 12.

In some embodiments, the processor 303 controls the antenna 104 via the transmit/receive interface circuit 301 to provide and receive electromagnetic energy (e.g., communication signals including packet data) to and from the UAS 12 (FIG. 1) using the antenna 104. The radio unit 112 can also be a ground-based or naval based radio. The antenna 104 is an omnidirectional or directional antenna (e.g., steerable). For the control system 102 on board the UAS 12, the antenna 104 is mounted on a surface or within the UAS 12. The antenna 104 is mounted in a variety of orientations which may affect the quality of the communication link between the radio nodes 14, 16, 18, 20, and 22 in some embodiments.

The processor 303 includes a communication link parameter capture module 306, a UAS location module 307, and a node location module 309. The processor 303 processes the communication signals from the transmit/receive interface circuit 301 to detect parameters associated with the communication signals (e.g., in real time). The parameters include, but are not limited to one or more of: signal-to-noise ratio (SNR), dropped packets or data statistics, quality of service, bit rate, received signal strength, channel quality, and packet loss. A packet processing layer and physical layer for the radio unit 112 provides the parameters according to communication handshaking and other protocols in some embodiments. The communication link parameter capture module 306 stores the parameters in the memory 304. The stored parameters can be processed in the control system 102 for compression and translation and can be communicated to a network or ground station for further processing in some embodiments.

The parameters are communicated over wireless communication links of the radio network 24 in some embodiments.

In some embodiments, the parameters for one of the UAS 12 and the communicating node are communicated from one of the UAS 12 and the communicating node to the other of the UAS 12 and the communicating node so that the UAS 12 and/or communicating node stores the parameters for both uplink and downlink communications. In some embodiments, the parameters are converted into a link quality rating (e.g., for both uplink and downlink) before being transmitted. In some embodiments, the parameters are transmitted in real time or near real time. In some embodiments, the parameters are collected after the route is completed wirelessly or via a transportable memory (e.g., a stick drive). The processor 303 causes the radio unit 112 to provide the stored link quality rating and/or the parameters to a ground station associated with the control of the radio network 24 or the UAS 12 in some embodiments.

The communication link parameter capture module 306 also receives location information for each communication in some embodiments. The location information is for the location of the UAS 12 determined by the UAS location module 307 and the location of the communicating node of the nodes 14, 16, 18, 20, and 22 determined by the node location module 309 in some embodiments. The location information is for only one of the UAS 12 or the communicating node of the nodes 14, 16, 18, 20, and 22 in some embodiments.

The communication parameters are tagged or stored according to the location, the identification of the communicating radio node, the time of the communication, the identification of the UAS route, the identification of the trip or pass of the UAS 12, the heading of the UAS 12, the relative heading to the radio node, the speed of the UAS 12, and the identification of the UAS 12 in some embodiments. In some embodiments, the parameters include antenna orientation and/or placement. The parameters are stored in a database 314 in some embodiments. In some embodiments, the information is viewable on the display 120. In some embodiments, the parameters are stored and tagged as uplink parameters and downlink parameters.

The UAS location module 307 and the node location module 309 determine the location of the UAS 12 and the communicating node, respectively. The location modules 307 and 309 are a global positioning system-based (GPS-based) unit or inertial reference system-based unit in some embodiments. The location as determined by the location modules 307 and 309 is in an altitude, latitude and longitude format or other format in some embodiments. The location information can be provided to the modules 307 and 309 by wireless communication to the UAS 12 or by wireless or wired communication to the communicating node of the radio nodes 14, 16, 18, 20, and 22 in some embodiments. Fixed nodes of the radio nodes 14, 16, 18, 20, and 22 can receive its location information at installation and stored the received location in the memory 304.

In some embodiments, the transmit/receive interface circuit 301 provides hardware components for processing communication signals. Data associated with the communications received by the antenna 104 are provided to the processor 303 from the transmit/receive interface circuit 301 in some embodiments.

The memory 304 stores the data associated with the communications as well as the parameters from the communication link parameter capture module 306. The memory 304 also stores software (machine instructions stored in a non-transitory medium) for operations executed by the processor 303. The modules 306, 307, and 309 are circuits, software or combinations thereof stored in the memory 304 in some embodiments. The memory 304 is any type of optical or electronic storage device. The processor 303 is a computing platform, such as one including one or more of a general purpose processor, a digital signal processor, an application specific circuit, or other processor.

In some embodiments, the database 314 is a geographic data base including the locations of transportation routes, such as, roads. The latitude, longitude, and altitude of transportation routes or zones can be provided by the database 314. In addition, the data base 314 can provide the directions of travel associate with the transportation routes. The database 314 is a USGS national transportation database in some embodiments. In some embodiments, the database 314 can include traffic data (e.g., be updated with real time traffic data) and the traffic data. In some embodiments, the database 314 is a worldwide or countrywide data base or is a smaller data base including locations of transportation routes in the vicinity of the UAS 12. In some embodiments, the processor 303 is in communication with a larger landbase or internet base database and receives downloads of transportation route information associated with the vicinity of the UAS 12.

The antenna 104 is an omnidirectional or directional antenna (e.g., steerable). For the control system 102 on board the UAS 12, the antenna 104 is mounted is on a surface or within the UAS 12. The antenna 104 is mounted in a variety of orientations which may affect the quality of the communication link between the radio nodes 14, 16, 18, 20, and 22 in some embodiments.

Figure 3:
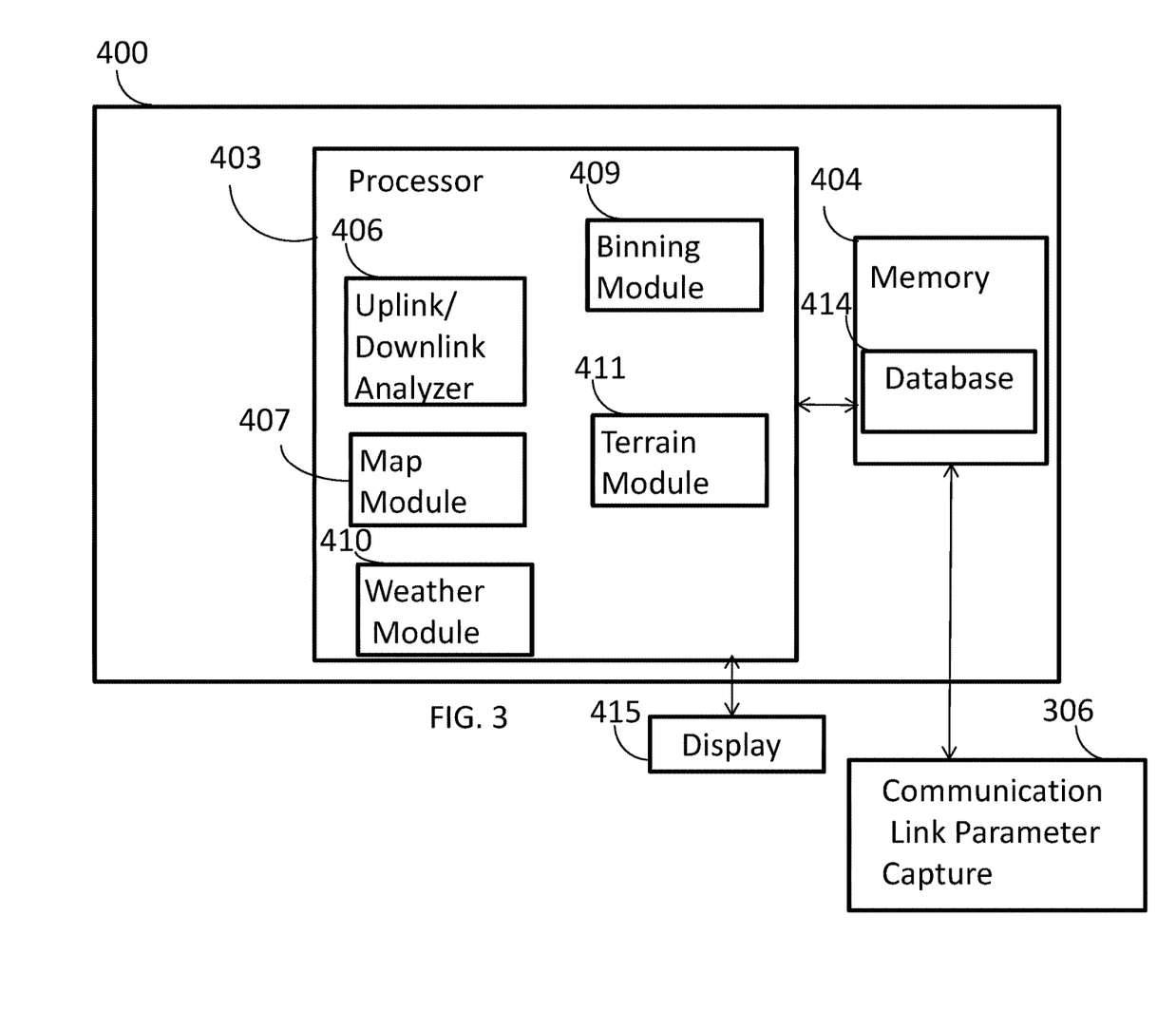
FIG. 3 is a is a general block diagram of a communication link analysis system for analyzing parameters associated with the radio illustrated in FIG. 2 according to exemplary aspects of the inventive concepts disclosed herein.

With reference to FIG. 3, a communication link analysis system 400 includes a processor 403, a memory 404, and an optional display 415. The communication link analysis system 400 receives the parameters captured by the communication link parameter capture module 306 and processes the parameters to improve for visualization of communication link performance and to provide insight into solutions where the communication links are underperforming in some embodiments. The parameters are provided in real time (via wireless communication links), on a per trip basis or on a periodic time basis in some embodiments. The communication link analysis system 400 is provided with the UAS 12 (FIG. 1), one or more of the radio nodes 14, 16, 18, 20, and 22, a control station for the UAS 12, a control station for the radio network 24 or a separate system in some embodiments.

The communication link analysis system 400 processes the parameters to provide a link quality rating at each location. The link quality rating is provided as a numerical rating from 1 to 7 with quality increasing with the numerical indicator. The link quality rating is an average of each parameter normalized to a number from 0 to 7 in some embodiments. In some embodiments, the link quality rating is an integer from 1 to N, where N is a number less than 10 (e.g., 8). In some embodiments, a subset of the parameters discussed above is used for the link quality rating. In some embodiments, certain parameters are weighted more heavily than others (e.g., received signal strength). In some embodiments, the parameters used for the link quality rating include one or more of: received signal strength, SNR, channel quality and dropped packet statistics.

The processor 403 includes an uplink/downlink analyzer module 406, a map module 407, a binning module 409, a weather module 410, and a terrain module 411 in some embodiments. Parameters and the linked quality rating are used to provide information on the display 415 for visualizing communication with performance. The processor 403 can process the data in accordance with weather data provided by weather module 410, traffic data and terrain data provided by terrain module 411. Terrain module 411 can provide terrain information from a terrain database. The terrain information includes locations of mountains, objects, transmitters, wind turbines, airports, and other known features that can affect communication link performance.

The uplink/downlink analyzer module 406 provides data for a display of uplink and downlink communication ratings (e.g. the link quality rating) in a side by side relationship in some embodiments. The side by side display allows an operator to determine if link quality discrepancies exist between an uplink side and a downlink side of the communication link. The discrepancy can indicate airside interference as opposed to ground based interference. When link quality is better for a downlink side than an uplink side, an indication of radio problems on the UAS 12 can be indicated. The problems are often due to a platform base interference which can be improved by antenna adjustments. When link quality is better for an uplink side than a downlink side and the downlink side for remaining radio nodes is higher quality, an indication of problems with the radio node can be indicated.

The map module 407 is configured to provide a map of the route of the UAS 12. The map includes geographic features, roads, and other information. The other information includes traffic information and weather information in some embodiments. The route of the UAS 12 is mapped with indications of link quality. For example, color coding along the route is used to indicate areas of good, fair and poor communication link quality (e.g., poor 1-2, fair 3-5, good 6-8) in some embodiments. The map includes topographical information provided from the terrain module 411 so that radio channels associated with terrain can be viewed with respect to link performance. Display of such a map on the display 415 assists in the determination of whether placement of antenna on the UAS 12 or placement of the radio nodes 14, 16, 18, 20, or 22 should be changed to improve link performance in light of geographic features in some embodiments.

In some embodiments, the processor 403 receives traffic information related to communication traffic in the environment. The traffic information is mapped with the link quality ratings so that interference associated with various communication links can be analyzed with respect to traffic in some embodiments.

The binning module 409 provides quality ratings for communications at each location and with each radio node of nodes 14, 16, 18, 20, and 22 of the radio network 24 in some embodiments. Such information provides an indication of whether a radio node is performing properly. For example, historical performance at each location can indicate whether radio performance is a chronic or one time problem. The binning module 409 provides data filtered by radio tower or node so that a particular radio node performance is readily ascertainable in some embodiments.

In some embodiments, the processor 403 is configured to aggregate data across many flights and average noise associated with the communication links to determine chronic issues. The data can be filtered by altitude, antenna orientation, and heading to determine if UAS masking is occurring. The information can be used to determine if higher altitude, antenna orientation changes, or route changes can improve link quality. The information is provided on a map of the route to show areas along the route and their historical link quality.

In some embodiments, the communication link analysis system 400 can be used to analyze GNSS solution quality (number satellites, accuracy, etc.). In some embodiment, payload statistics such as payload quality can be used to detect vegetation encroachment and powerline droop. Correlations with weather conditions (as provided by the weather module 410) can be used to sense the effects of cloud cover, wind, temperature, etc. In some embodiments. The weather module 410 receives weather information from weather sites in some embodiments.

The memory 404 is similar to the memory 304 and stores data associated with the link quality rating and software for the modules 406, 407, 409, and 411. The memory 304 includes a database 414. Historical data can be stored in the database 414. The modules 406, 407, 409, 410 and 411 are circuits, software or combinations thereof stored in the memory 404 in some embodiments. The processor 403 is similar to the processor 303.

Figure 4:
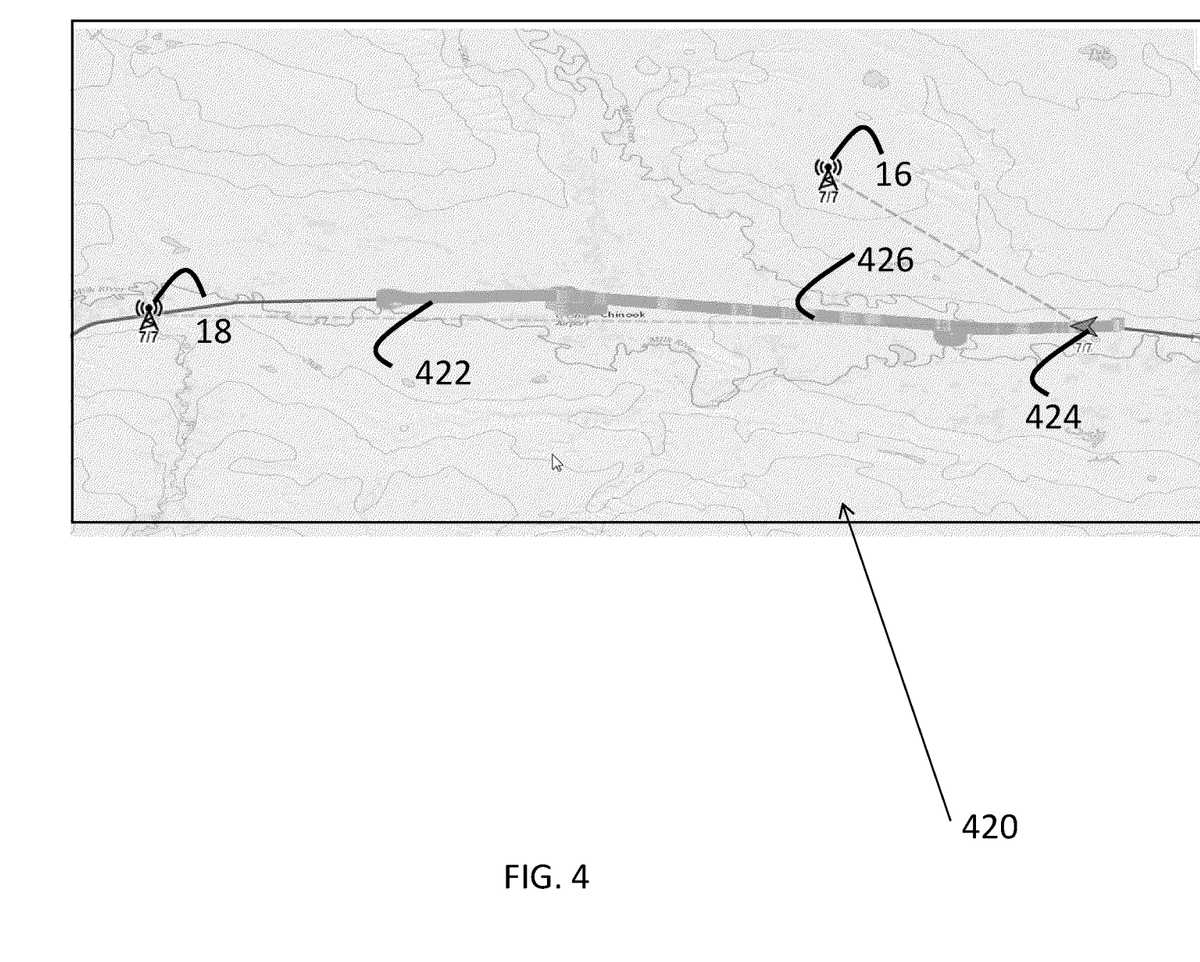
FIG. 4 is a schematic drawing of a map display provided by the communication link analysis system illustrated in FIG. 3 according to exemplary aspects of the inventive concepts disclosed herein.

With reference to FIG. 4, the map module 407 (FIG. 3) provides data for a map display 420 on the display 415 (FIG. 3). The map display 420 includes a route 422. The location of the UAS 12 is represented by an icon 424. Radio nodes 16 and 18 are shown on the map display 420. A region 426 shows poor link quality. The route 422 is color coded (red, yellow, green) (shown in gray scale in FIG. 4) such that the region 426 can be spotted. In some embodiments, icons are used to show levels of link quality along the route 422. Other lower quality areas are shown as lighter areas along the route 422 in FIG. 4 in some embodiments. The map display 420 includes geographical features such as rivers and roads as well as topographical information and airport locations. The map display 420 can be provided real time for real time use.

Figure 5:
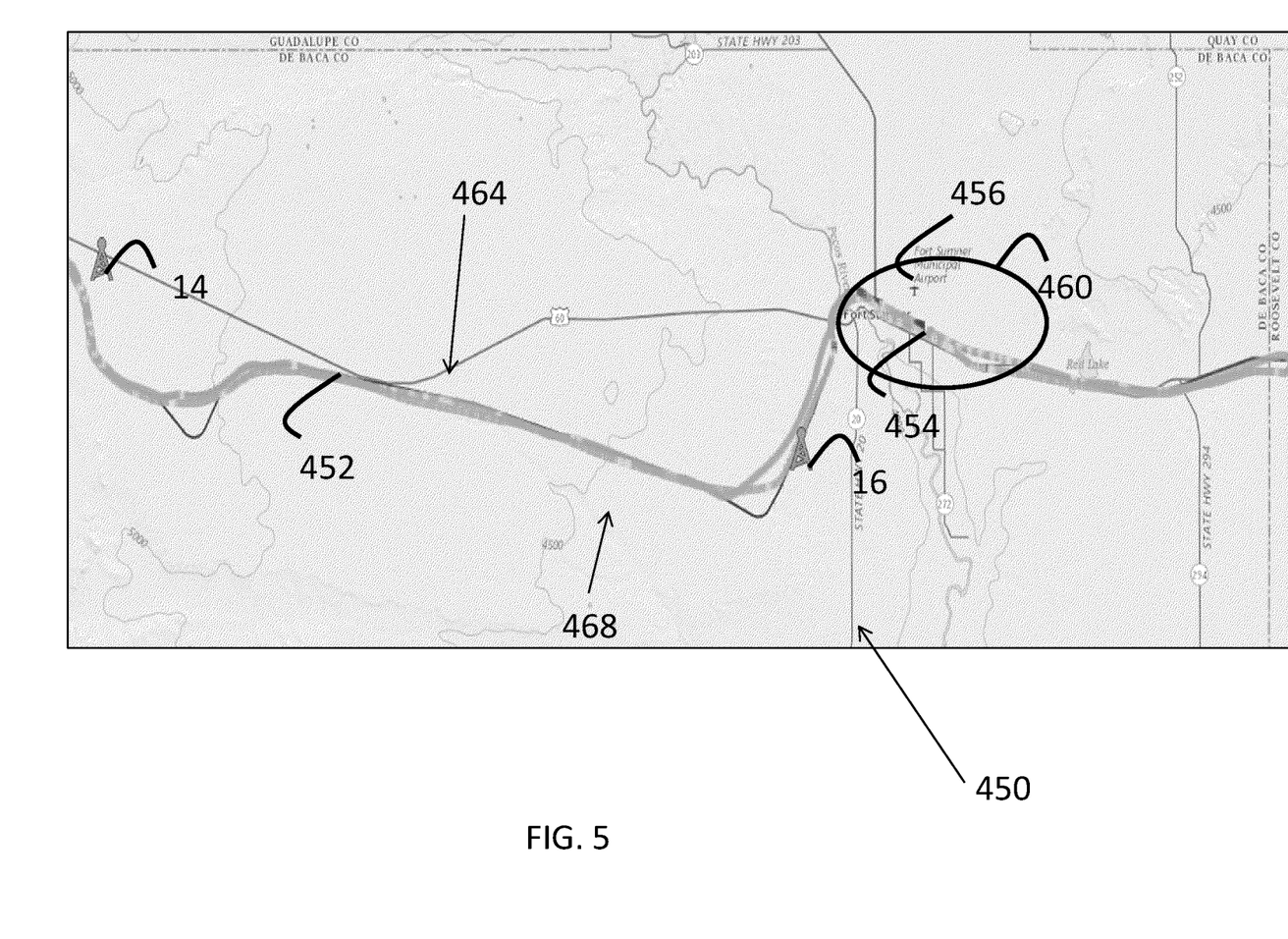
FIG. 5 is a schematic drawing of a map display provided by the communication link analysis system illustrated in FIG. 3 according to exemplary aspects of the inventive concepts disclosed herein.

With reference to FIG. 5, the map module 407 (FIG. 3) provides data for a map display 450 on the display 415 (FIG. 3). The data includes average historical link quality ratings along a route that have been stored over a time period. The map display 450 shows a large area of historical performance problems near an airport along a route 452. A portion 460 of the route 452 has historical poor link quality ratings as shown by color coding on the route 452 (areas 454 and 456) in some embodiments. The route 452 is color coded (shown in gray scale in FIG. 5) similar to the route 422 (FIG. 4) in some embodiments. Other areas of poor link quality include areas 464 and 468. The viewing of historical data on the map display 450 allows chronic problems to be identified and lessens the effects of one-time instances due to temporary issues.

The user can zoom and pan for inspection of various places on the routes 422 (FIG. 4) and 452 (FIG. 5). In some embodiments, the route 452 is color coded with historical quality ratings and can be toggled between real time and historical ratings. In some embodiments, the map display 420 is provided on the same screen as the map display 450 so discrepancies between the historical quality ratings and real time quality ratings are viewed on one screen.

Figure 6:
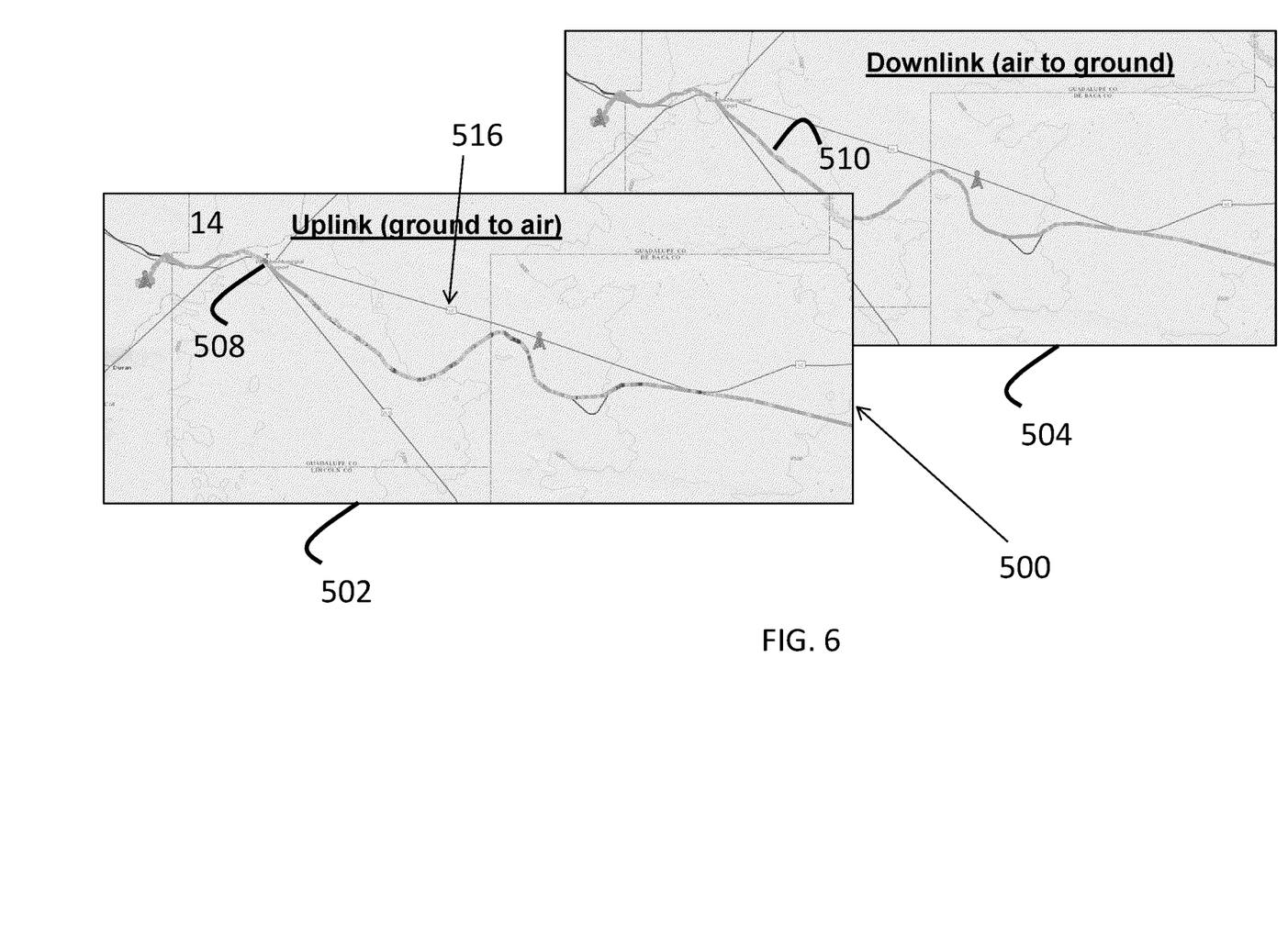
FIG. 6 is a schematic drawing of a map display including a downlink map and an uplink map provided by the communication link analysis system illustrated in FIG. 3 according to exemplary aspects of the inventive concepts disclosed herein.

With reference to FIG. 6, the uplink/downlink analyzer module 406 (FIG. 3) provides data for an uplink/downlink display 500 on the display 415 (FIG. 3). The display 500 includes an uplink communication map 502 and a downlink communication map 504. The juxtaposition of the maps 502 and 504 including routes 508 and 510 with color coded link quality ratings (shown in gray scale in FIG. 6) allows discrepancies between uplink and downlink quality to be readily discerned. The discrepancies indicate ground based interference sources versus airside interference sources. If the uplink side is persistently worse than the downlink side, an indication of platform-based interference can be provided.

Figure 7:
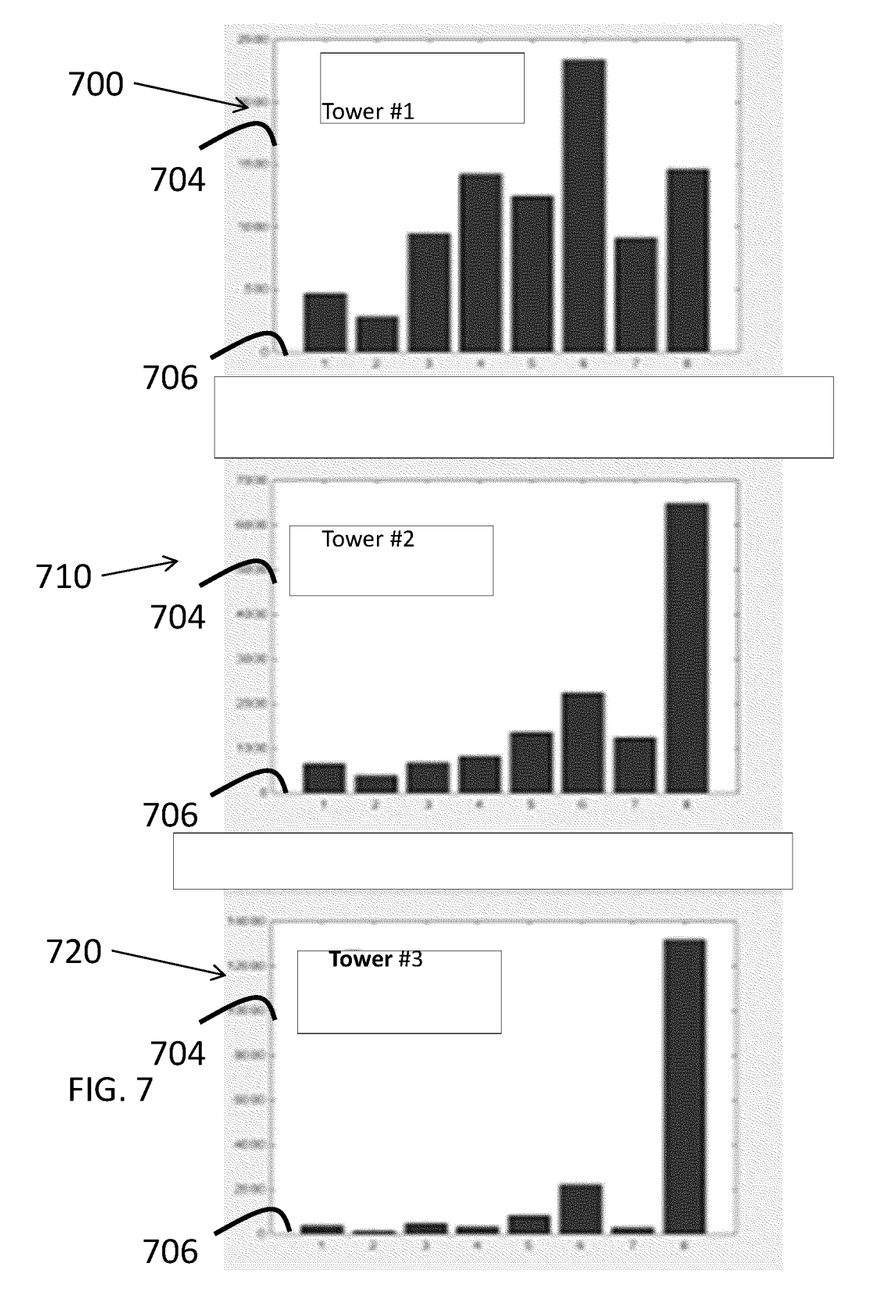
FIG. 7 a schematic drawing of binning charts provided by the communication link analysis system illustrated in FIG. 3 according to exemplary aspects of the inventive concepts disclosed herein.

With reference to FIG. 7, the binning module 409 (FIG. 3) provides data for a binning charts 700, 710 and 720 on the display 415 (FIG. 3). Each of the charts 700, 710, and 720 includes an X-axis 706 indicating link quality ratings and a Y-axis 704 representing the number of occurrences (e.g., logarithmically or linearly from 0-10,000 plus) at each quality (e.g., 1-8) and is associated with a particular radio node in some embodiments. The link quality ratings for a particular link or node are a numerical value from 1-8 for the charts 700, 720, and 720 in some embodiments. The binning charts 710, 710, and 720 indicate the number of occurrences of each quality rating associated with a particular radio node over a period of time. The aggregation of data from multiple flights highlights the chronic problem and averages out noise in the data period. As shown, the charts 710 and 720 show well-functioning radio nodes or towers while the chart 700 shows chronic issues with the radio node.

Charts 700, 710 and 720 can be created on a weather-type basis, a location basis, time of day basis, time of year basis, a heading basis, a location basis, or traffic basis to detect poor performance due to particular factors in some embodiments. The data can then be additionally filtered by other data and additional plots can be provided by the binning module 409. For example, the charts 700, 710, and 720 formed using heading information as opposed to radio node are be used to determine if orientation dependencies are affecting link quality in some embodiments. The heading information is relative heading to the radio node in some embodiments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A radio unit for an unmanned aviation system traveling along a route, the radio unit comprising:
   a memory; and
   a processor configured to capture communication link parameters associated with a communication link between the unmanned aviation system and at least one radio node in a radio network and store the communication link parameters in the memory, the processor being configured to cause the communication link parameters to be transmitted to a ground station, the communication link parameters comprising a position of the unmanned aviation system, a position or placement of the antenna on the unmanned aviation system, an identification of the unmanned aviation system, a downlink radio quality parameter, and an uplink radio quality parameter.

2. The radio unit of claim 1, wherein the communication link parameters comprise an antenna orientation parameter and wherein the uplink radio quality parameter and the downlink radio quality parameter comprise a packet loss characteristic.

3. The radio unit of claim 2, wherein the uplink radio quality parameter comprises a received signal strength at the at least one radio node, the received signal strength at the at least one radio node being received by the unmanned aviation system from the at least one radio node over the communication link.

4. The radio unit of claim 1, further comprising:
a location module comprising a satellite positioning receiver on-board the unmanned aviation system.

5. The radio unit of claim 1, wherein the communication link parameters further comprise a location of the at least one radio node associated with the communication link.

6. The radio unit of claim 5, wherein the communication link parameters comprise a quality factor derived from a plurality of radio factors.

7. The radio unit of claim 6, wherein the quality factor is an integer from 1 to N, where N is less than 10.

8. A method of providing visualization of communication link performance along a route for an unmanned aviation system, the method comprising:
providing an antenna parameter indicating a position or placement of the antenna on the unmanned aviation system;
receiving dropped packet parameters associated with a plurality of radio links from the unmanned aviation system;
providing a quality factor for the plurality of radio links along the route corresponding to locations of the unmanned aviation system using the dropped packet parameters, wherein the quality factor is provided for uplink communications and downlink communications;
providing a map displaying the quality factor at the locations along the route, wherein the map comprises the quality factor at the locations along the route for the uplink communications and the downlink communications; and
displaying an indication of the antenna parameter.

9. The method of claim 8, wherein the map includes an uplink communication map section and a downlink communication map section.

10. The method of claim 8, wherein the route is color coded along the route according to the quality factor.

11. The method of claim 10, wherein the route is color coded according to three qualities.

12. The method of claim 10, wherein the quality factor is an integer form 1 to N, where N is less than 10.

13. The method of claim 10, wherein the quality factor is tagged according to radio nodes in a radio network used on the route.

14. The method of claim 13, wherein the quality factor is displayed according to a bin chart for the radio nodes.

15. A communication link analysis system for analyzing communication link performance for an unmanned aviation system traveling over a route using a radio network comprising a plurality of radio nodes, the communication link analysis system comprising:
a memory for storing quality parameters associated with communication links between the unmanned aviation system and the radio nodes and a position or placement of the antenna on the unmanned aviation system when the quality parameters are determined; and
a processor configured to map the quality parameters by location along the route or provide a bin chart of the quality parameters by radio node, the quality parameters being derived from radio link parameters provided by the unmanned aviation system using dropped packet statistics, wherein the processor is configured to map the quality parameters by location along the route, wherein a map includes an uplink communication map section and a downlink communication map section, wherein the uplink communication map section comprises uplink parameters of the quality parameters for uplink communications and the downlink communication map section comprises downlink parameters of the quality parameters for downlink communications, wherein the processor is configured to provide an indication of the position or placement of the antenna on the unmanned aviation system.

16. The communication link analysis system of claim 15, wherein the radio link parameters comprises a received signal strength at the unmanned aviation system.

17. The communication link analysis system of claim 15, wherein the processor is configured to provide an indication of the antenna placement for the unmanned aviation system.

18. The communication link analysis system of claim 15, further comprising:
wherein the processor is configured to map the quality parameters by location along the route, wherein the map includes terrain features.

19. The communication link analysis system of claim 15, wherein the quality parameters are tagged with weather information.

20. The communication link analysis system of claim 15, further comprising:
wherein the quality parameters are tagged with direction of travel or altitude of the unmanned aviation system.

* * * * *